S. H. EASTERDAY.
VEHICLE WHEEL.
APPLICATION FILED NOV. 30, 1914.
1,164,706.
Patented Dec. 21, 1915.
2 SHEETS—SHEET 2.
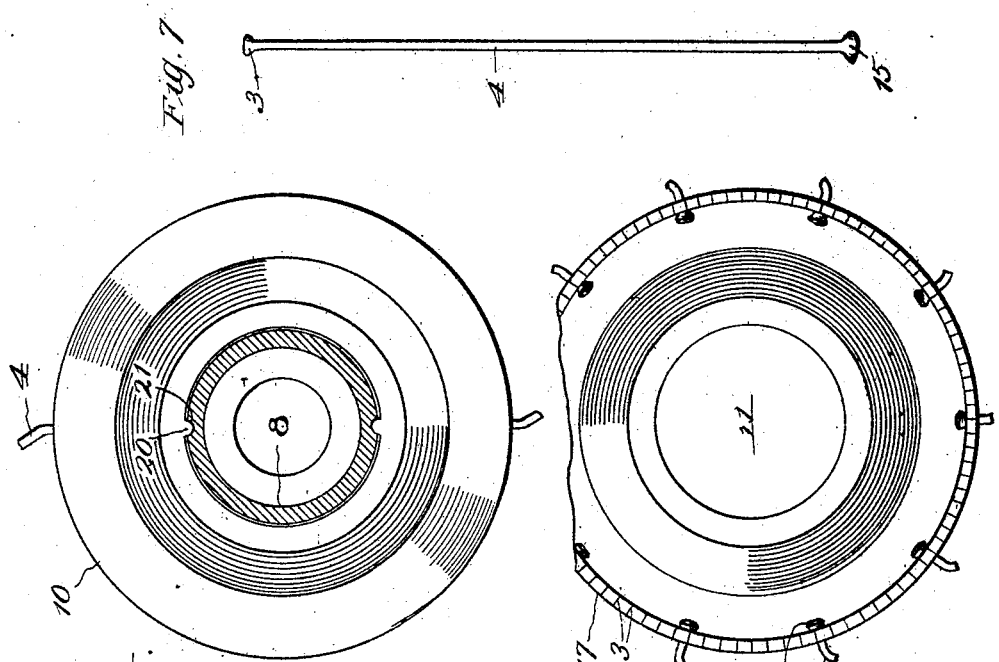
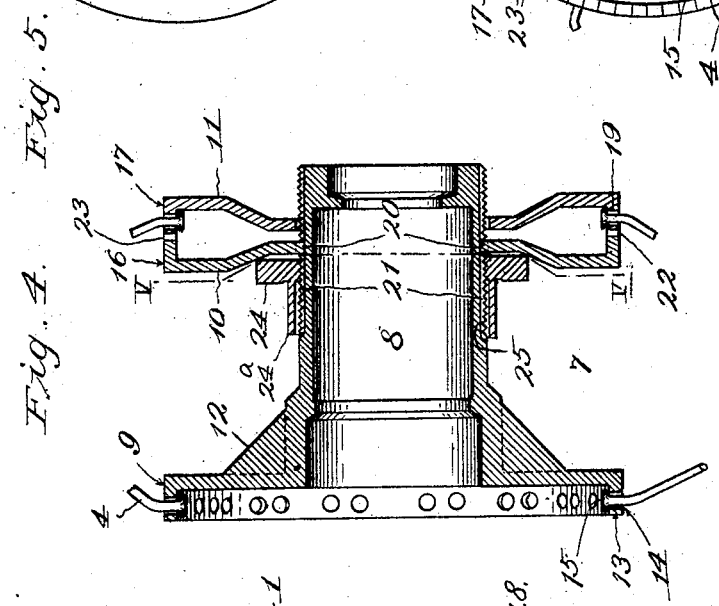
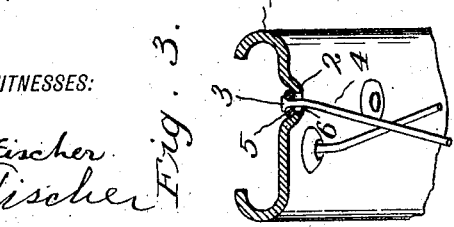
WITNESSES:
E. M. Fischer
L. J. Fischer
INVENTOR:
S. H. Easterday,
BY F. G. Fischer,
ATTORNEY.

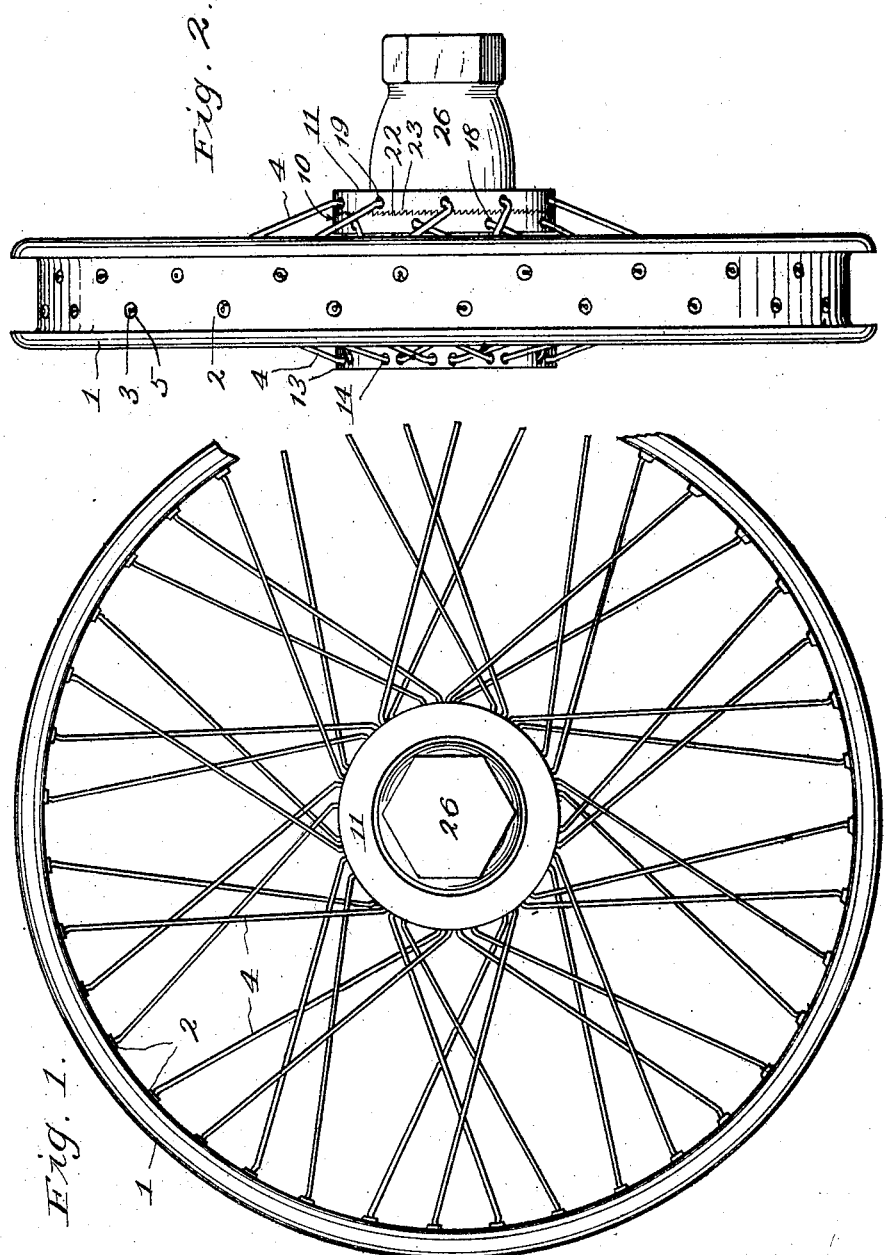

UNITED STATES PATENT OFFICE.

SIDNEY H. EASTERDAY, OF KANSAS CITY, MISSOURI.

VEHICLE-WHEEL.

1,164,706.  Specification of Letters Patent.  Patented Dec. 21, 1915.

Application filed November 30, 1914. Serial No. 874,870.

*To all whom it may concern:*

Be it known that I, SIDNEY H. EASTERDAY, a citizen of the United States, residing at Kansas City, in the county of Jackson and State of Missouri, have invented certain new and useful Improvements in Vehicle-Wheels, of which the following is a specification.

My invention relates to vehicle wheels, and more particularly to automobile wheels embodying wire spokes, and the primary object of the invention is to provide new and useful means whereby all of the spokes can be simultaneously and uniformly tensioned, and also means whereby a defective spoke can be readily replaced by a new one.

Other features of the invention will hereinafter appear, and in order that said invention may be fully understood, reference will now be made to the accompanying drawings, in which:

Figure 1 is a broken side elevation of a wheel embodying my invention. Fig. 2 is a front elevation of the wheel. Fig. 3 is a cross section of the wheel rim, enlarged. Fig. 4 is a vertical section of the wheel hub. Fig. 5 is an irregular section on line V—V of Fig. 4. Fig. 6 is an elevation of a ratchet plate constituting part of the wheel hub. Fig. 7 is an elevation of one of the wheel spokes. Fig. 8 is a detail of a split washer employed in carrying out the invention.

In carrying out the invention, I employ a metallic rim 1 of ordinary configuration, except that it is provided with two annular rows of sockets 2 to receive the outer heads 3 of spokes 4. Said sockets 2 are also of sufficient depth to receive split washers 5, which prevent the heads 3 from pulling out through the holes 6 in the bottoms of the sockets 2. The sides of the sockets 2 also prevent the split washer 5 from spreading and allowing the heads to pass therethrough. The two rows of sockets 2 are spaced apart as disclosed by Fig. 3, so that the upper portions of the spokes may be crossed and thus extend at a greater angle to a vertical plane, in order to better resist lateral strains tending to dish the wheel.

7 designates the wheel hub, which consists generally of a tubular extension 8, a disk 9 integral with one end of said tubular extension 8, and ratchet plates 10 and 11 adjustable upon the tubular extension 8 for the purpose of tensioning the spokes 4. The tubular extension 8 and the disk 9 are reinforced at their juncture with the ribs 12, and said disk 9 has an integral annular flange 13 at its outer margin provided with a row of holes 14, to receive the inner heads 15 of the spokes 4. The ratchet plates 10 and 11, like the disk 9, have annular marginal flanges 16 and 17 provided with holes 18 and 19, respectively, to receive a number of the spokes 4. The ratchet plate 10 may be adjusted longitudinally of the tubular extension 8, but is prevented from rotating thereon by oppositely-disposed lugs 20 on said ratchet plate entering longitudinal grooves 21 in the tubular extension (see Figs. 4 and 5). The ratchet plate 11 is free to move both rotatably and longitudinally of the tubular extension 8, for the purpose of tensioning the spokes, as will hereinafter appear. The side of the flange 16 on the ratchet plate 10 has ratchet teeth 22, to engage corresponding ratchet teeth 23 on the adjacent side of the flange 13 of the ratchet plate 11, to secure the latter from backward rotation. Lateral adjustment of the ratchet plates 10 and 11 is accomplished by a nut 24, engaging the threaded portion 25 of the tubular extension 8 and bearing against one side of the ratchet plate 10, as disclosed by Fig. 4. Nut 24 has a tubular portion $24^a$, extending over the threads 25, to protect the same from mud, dust, etc.

26 designates a hub cap adapted to engage the threaded portion 25 and bear against the ratchet plate 11, so that the two ratchet plates 10 and 11 may be firmly secured between the nut 24 and said hub cap 26.

In practice, the outer heads 3 of the spokes 4 are first placed through the holes 14, 18 and 19 in the flanges 13, 16 and 17, respectively, of the hub and then passed through the holes 6 in the rim 1, where they are secured in the sockets 2 by the split washers 5. The inner heads 15 of the spokes 4, being larger than the outer heads 3, will not pass through the holes in the hub flanges, and consequently washers or other securing devices are unnecessary. After the spokes 4 have all been placed in position, the ratchet plate 11 is rotated through the intermediacy of a spanner wrench, or other tool, to take up the greater portion of the slack in the spokes. When thus rotating the ratchet plate 11, the slanting sides of its teeth 23 slip by the corresponding sides of the ratchet teeth 22 until the rotary movement ceases, when the abrupt sides of the teeth 23 immediately engage the corresponding sides of the teeth 22, and thus prevent the ratchet plate 11 from turning backward and permitting the spokes to become slack. Final tensioning of the spokes is then accomplished by forcing the ratchet plates 10 and 11 outwardly upon the tubular extension 8, through the intermediacy of the nut 24.

The hub 7 is arranged to receive the customary roller or ball-bearings, but since said bearings form no part of the present invention, I deem it unnecessary to show them on the drawings.

While I have shown and described the preferred form of my invention, I of course reserve the right to make such changes in the construction, combination, and arrangement of parts, as properly fall within the spirit and scope of the claims.

Having thus described my invention, what I claim and desire to secure by Letters Patent, is:

1. A vehicle wheel, consisting of a rim, wire spokes connected at one end to said rim, and a hub to which the other end of the spokes is connected, said hub embodying ratchet plates to simultaneously tension the spokes and means to move the plates longitudinally of the hub, substantially as described.

2. In a vehicle wheel, a hub, a member slidable on the hub, a second member slidable and rotatable on the hub, means to lock the second member to the first named member, spokes connected to the wheel rim and to said members, and means to move said members longitudinally of the hub and in unison when locked.

3. In a vehicle wheel, a hub having a member on one end to which some of the spokes are connected, and a pair of relatively rotatable members on the opposite end of the hub to each of which other of the spokes are independently connected.

4. In a vehicle wheel, a hub, a rigid member on the hub to which some of the spokes are connected, a second non-rotatable member on the hub to which other of the spokes are connected, a third member rotatable on the hub to which still other of the spokes are connected, and means to lock said third member against rotation.

5. In a vehicle wheel, a hub consisting of a disk, a tubular extension projecting laterally from said disk and provided with peripheral threads, a plate slidable upon said extension, a second plate slidable and rotatable upon the extension and coacting with the first plate, and a nut engaging the peripheral threads of the extension to adjust the plates longitudinally of said extension.

6. In a vehicle wheel, a rim, spokes suitably connected at their outer ends to said rim, a disk to which a number of the spokes are suitably connected at their inner ends, a tubular extension projecting laterally from said disk and provided with a longitudinal groove, a ratchet plate slidably mounted upon said extension and provided with a lug to enter said groove, a number of the spokes being connected at their inner ends to said ratchet plate, a second ratchet plate slidable and rotatable upon the extension and having its teeth adapted to engage the teeth of the first ratchet plate, a number of the spokes being connected at their inner ends to the second ratchet plate, and means to adjust the ratchet plates longitudinally of the extension.

7. In a vehicle wheel, a rim, spokes suitably connected at their outer ends to said rim, a disk having a marginal flange to which a number of the spokes are suitably connected at their inner ends, a tubular extension projecting laterally from said disk and provided with peripheral threads and longitudinal grooves, a ratchet plate slidably mounted upon said extension and provided with lugs to enter the grooves, said ratchet plate having an annular flange provided with ratchet teeth and to which a number of the spokes are suitably connected at their inner ends, a second ratchet plate slidably and rotatably mounted upon the extension and having an annular flange provided with ratchet teeth to engage those on the first ratchet plate, said flange on the second ratchet plate having connections with the inner ends of the remainder of the spokes, so that when said second ratchet plate is rotated the spokes will be simultaneously adjusted, and a nut engaging the threads of the extension to adjust the ratchet plates laterally to effect final tensioning of the spokes, substantially as described.

SIDNEY H. EASTERDAY.

Witnesses:
F. G. FISCHER,
L. J. FISCHER.